May 1, 1934. R. F. KUNS 1,956,688
RETRACTILE WHEEL CARRIER JACK
Filed April 3, 1933 2 Sheets-Sheet 1

INVENTOR.
Ray F. Kuns
BY
ATTORNEY.

May 1, 1934.                    R. F. KUNS                    1,956,688
                        RETRACTILE WHEEL CARRIER JACK
                           Filed April 3, 1933          2 Sheets-Sheet 2
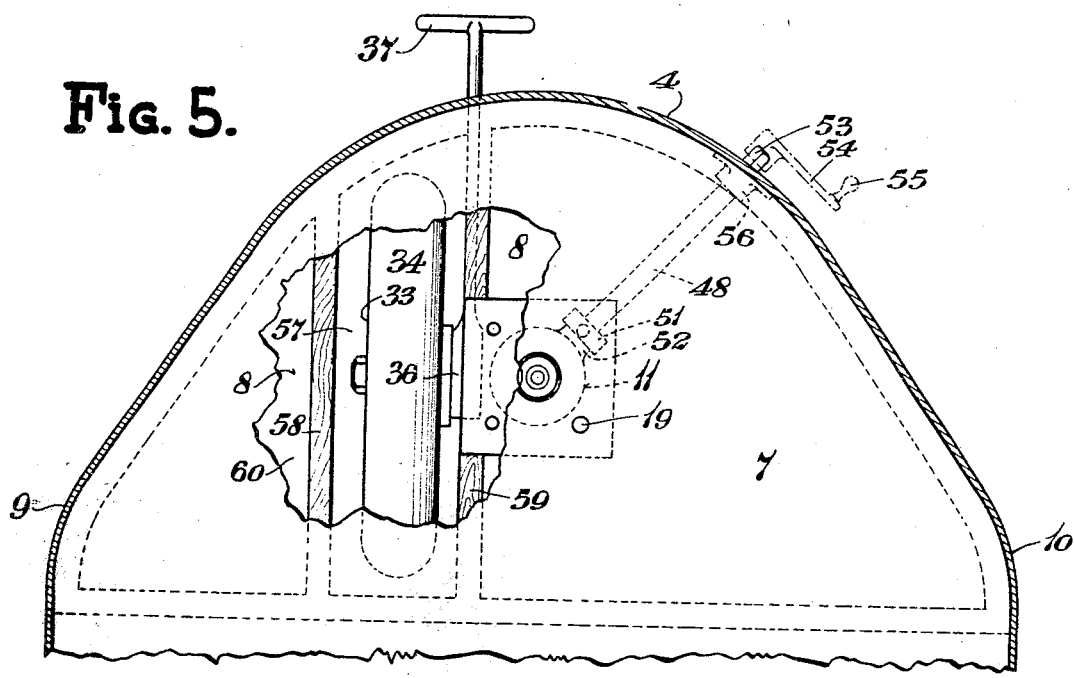
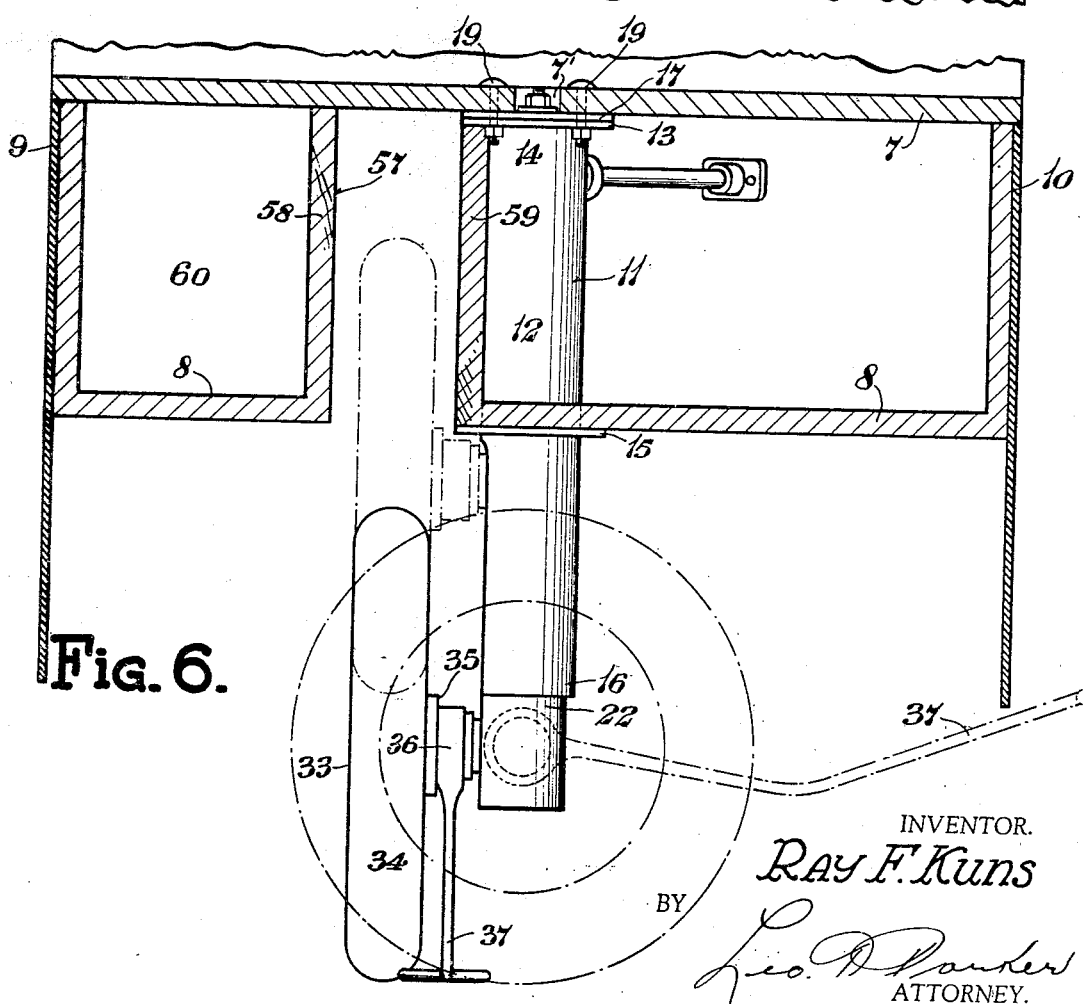
INVENTOR.
Ray F. Kuns
BY
ATTORNEY.

Patented May 1, 1934

1,956,688

UNITED STATES PATENT OFFICE 1,956,688

RETRACTILE WHEEL CARRIER-JACK

Ray F. Kuns, Madisonville, Ohio

Application April 3, 1933, Serial No. 664,105

6 Claims. (Cl. 280—33.1)

The invention relates to means particularly adapted for use in carrying an interchangeable wheel of a motor vehicle trailer and, also, adapted for use in supporting the front end of the trailer and leveling the floor thereof.

Heretofore, users of motor vehicle trailers having two rear wheels have experienced considerable difficulty and inconvenience in maintaining the floor of the trailer in a horizontal position when the trailer is disconnected from the transporting motor vehicle and intended to be utilized by the owner for cooking, living and sleeping quarters. Also, users of trailers of this type generally find it necessary to carry an extra or spare wheel interchangeable with the rear wheels for utilization and substitution when the tire on one of the rear wheels becomes punctured or otherwise damaged.

Various means have been utilized for supporting the front end of a trailer when the same is in stationary position, particularly the type of trailer which is supplied with two rear wheels that support the vehicle during the time when it is being towed. Generally speaking, however, the means previously used for these different purposes comprise several apparatuses which result in inconvenience to the owner of the trailer at various times, such as when the trailer is being positioned for camping purposes, and the like.

Therefore, the objects of the invention are to provide simple, practical and efficient means adapted to carry a wheel interchangeable with the rear wheels of a trailer when the same is being towed; to provide efficient and convenient means to support the weight of the front portion of the trailer when coupling to or uncoupling the tow car; to provide efficient and convenient means by utilization of which the front end of the trailer may be quickly raised and lowered when the trailer is in a stationary position for the purpose of leveling or horizontally positioning the floor of the trailer; to provide convenient and easily accessible means by which the trailer may be manually steered and pulled from one location to another with minimum effort; and to provide a construction of the front end of said trailer which conceals said wheel and apparatus during the time said wheel is retracted when the trailer is being towed over the highways.

The invention consists in providing efficient means for carrying an extra wheel and tire of a trailer having two rear wheels and in providing said carrying means with manually operative apparatus, the operation of which is adapted to raise and lower said extra or front wheel and tire at the will and convenience of the operator and in providing a hand contact handle connected with said wheel by which the trailer may be conveniently pulled and steered over the ground from one location to another while the front end of the trailer is being supported by the front wheel.

The invention, also, consists in the combination of the elements, arrangement of the parts and in the details of the construction, as hereinafter claimed.

In the drawings:

Fig. 5 is a section taken on a line corresponding to 5—5 in Fig. 1, with parts broken away; and Fig. 6 is a section taken on a line corresponding to 6—6 in Fig. 2, with parts broken away.

Figure 1:
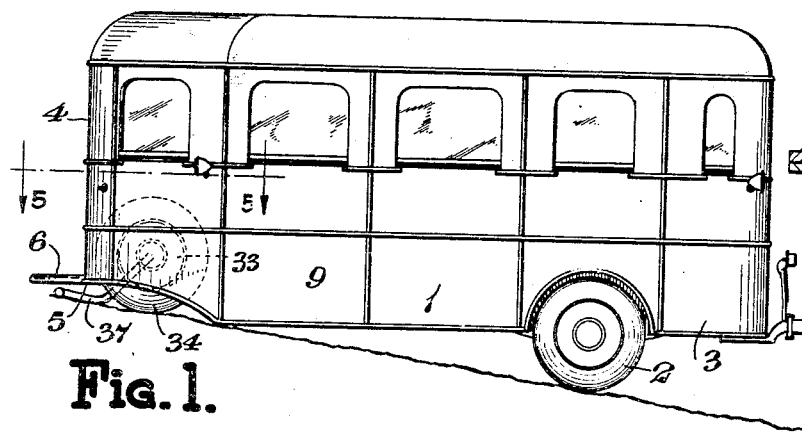
Fig. 1 is a side elevational view of the trailer coach with the front wheel partly lowered.

The preferred construction of the invention is exemplified with the trailer or coach 1 having the usual rear wheels 2 mounted at the rear 3 of the coach. The trailer 1 has a round or curved front 4 to which it attached at the lower edge 5 the usual tow bar 6 which is adapted to be connected with the rear end of a conventional motor vehicle, such as a passenger carrying automobile, for the purpose of being transported over the highways.

Suitably secured to the front 4 are the upper and lower spaced apart horizontal panels 7 and 8. The upper panel 7 extends from the side 9 to the side 10 of the coach, whereas the lower panel 8 extends from the side 10 of the coach to a point approximately midway between the sides 9 and 10.

Centrally disposed of the curved front 4 is the vertical support or jack 11 comprising the tube or housing 12 which has the outwardly extending flange 13 integrally formed with its upper end 14 and which has the outwardly extending flange 15 integrally formed therewith intermediate the upper and lower ends 14 and 16. The flange 15 is secured to the bottom of the horizontal panel 8. Suitably fixed to the upper end 14, of the tube 12, is the circular plate 17 having the centrally disposed hole 18 therein. The plate 17 is fixed, as by the bolts 19, to the bottom of the horizontal panel 7.

In the side 20 of the tube 12 is the slot 21 whose side walls extend vertically from the lower end 16 of the tube to a point below the flange 15.

Slidably mounted in the tube 12 is the hollow piston 22 having the hole 23 in its upper end and having fixed thereto, as by the bolts 24, the internally threaded nut 25 whose threaded hole 26 is in vertical alignment with the hole 23 which however is slightly larger than the hole 26, for purposes hereinafter fully explained.

Within the piston 22 is the vertical guide tube 27 having its upper end 28 threaded in the lower portion of the hole 23 in the top or upper end of the piston. Fixed in the hole 29, which extends through the lower end 30, of the piston 22 is the horizontal wheel spindle 31 which extends outwardly through the slot 21, in the tube 12, and has mounted on its outer end the usual hub 32 to which is releasably attached the usual wheel 33 having mounted thereon the pneumatic tire 34. The wheel 33 is the same size as the rear wheels 2 of the trailer 1 whereby the wheel 33 with its tire is interchangeable with respect to the rear wheels 2, so that as hereinafter explained, at any time it is desirable to do so, either of the rear wheels 2 may be removed and the wheel 33, with its tire 34, may be substituted therefor.

Rotatably mounted on the spindle 31, intermediate the inner edge 35 of the hub 32, and the side 20 of the tube 12, is the boss 36 having integrally formed therewith the outwardly extending hand contact handle 37 for purposes hereinafter explained. Intermediate the inner edge of the boss 36 and the side 20 of the tube 12 is the collar 38 whose function is to maintain the boss 36 in spaced apart relation with the side 20 of the tube.

In the spindle 31 is the hole 39, centrally disposed in the piston 22. Received in the hole 39 is the lower end 40 of the guide tube 27 which is fixed to the spindle as by welding, brazing or the like means.

Threaded in the nut 25 is the vertical screw 41 whose upper end 42 is reduced and received through the hole 18 in the plate 17. The reduced end 42 has threaded thereto the nut 43 which is in contact with the washer 44 intermediate the nut and the upper surface of the plate 17. The reduced end 42, nut 43 and the washer 44 is received in the hole 7' in the horizontal panel 7. Fixed to the upper end of the screw 41 is the bevel gear 45 which meshes with the bevel gear 46 suitably fixed to the inner end 47 of the horizontal shaft 48 which is rotatably mounted in the bearing 49 formed in the side 50 of the tube. Received around the shaft 48 is the collar 51 which contacts the outer surface of the boss 52 integrally formed with the tube 12 and in which the bearing 49 is provided. The shaft 48 extends outwardly through the front 4. The outer protruding end 53 of the shaft is rectangular and has mounted thereon the hand crank 54 whose knob 55 is adapted to be grasped by the hand of the operator for the purpose of rotating the shaft 48. Received around the shaft 48 is the collar 56 suitably secured to the inner surface of the front 4 for the purpose of providing a substantial bearing for the outer end of the shaft.

Rotation of the shaft 48, through the gears 45 and 46, imparts rotary movement to the screw 41 which, being threaded to the nut 25, raises or lowers the piston 22, with respect to the tube 12, dependent upon the direction in which the crank 54 is rotated. The screw 41 is received in the guide tube 27 and, when the piston is in its uppermost position, for the purpose of elevating the wheel, the lower end of the screw 41 is received through the spindle 31.

When the tow bar coupler 6, of the trailer or coach 1, is connected with the transporting motor vehicle, the crank 54 is revolved in a suitable direction for the purpose of elevating the wheel 33 in its uppermost position or fully retracted, as represented by dotted lines in Fig. 6, whereby the lower edge of the tire 34 is above the lower edge of the body of the coach and the wheel is received in the compartment 57 formed by the vertical panels 58 and 59. The panel 59 is received between the flanges 13 and 15, of the tube 12, and the panel 58 has its upper edge suitably secured to the lower surface of the panel 7 and to the edge of the panel 8 and forms a side to the cabinet 60 which may be utilized for various purposes.

If for any reason, while the coach is being transported over the highways, it is desired to substitute the wheel 33 for one of the two rear wheels 2 the crank 54 may be revolved and the piston 22 may be lowered whereby the wheel 33 is lowered to the position represented by full lines in Fig. 6, after which the wheel 33 may be removed from the hub 32 and substituted for one of the rear wheels 2. The removed rear wheel 2 may be attached to the hub 32 and the crank 54 rotated for the purpose of elevating the spindle 31 and the hub 32 with the substituted wheel.

Figure 2:
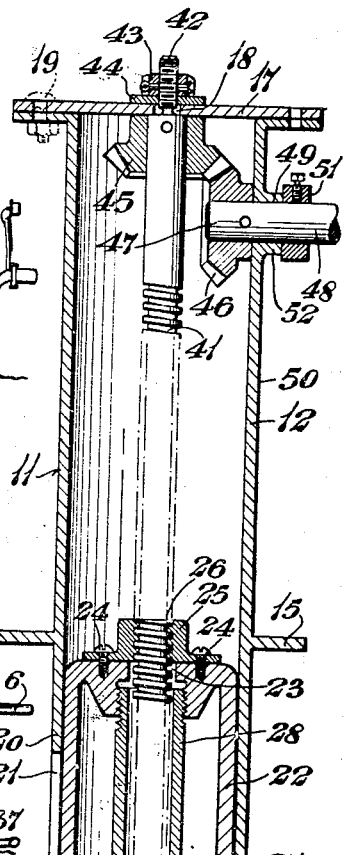
Fig. 2 is the same with the retractile front wheel in its lowermost position.
Figure 2:
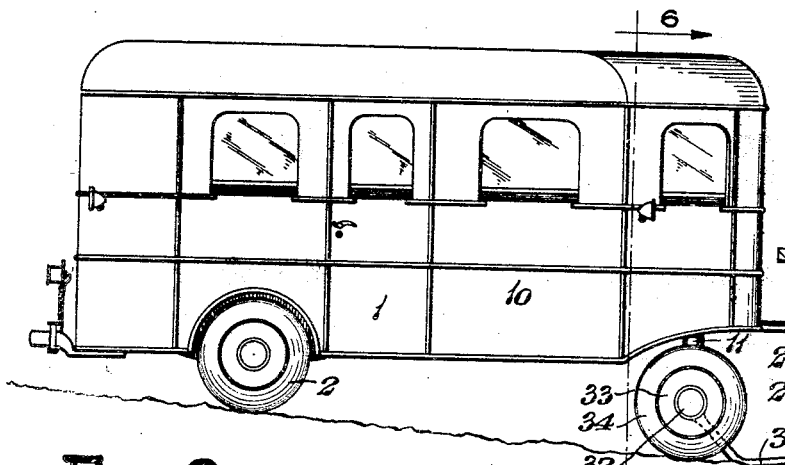
Figure 3:
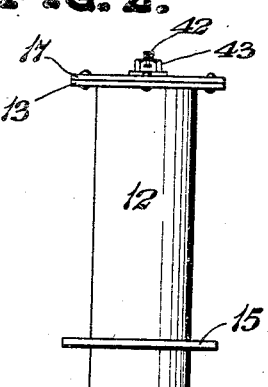
Fig. 3 is a side elevational view of the carrier-jack support.
Figure 4:
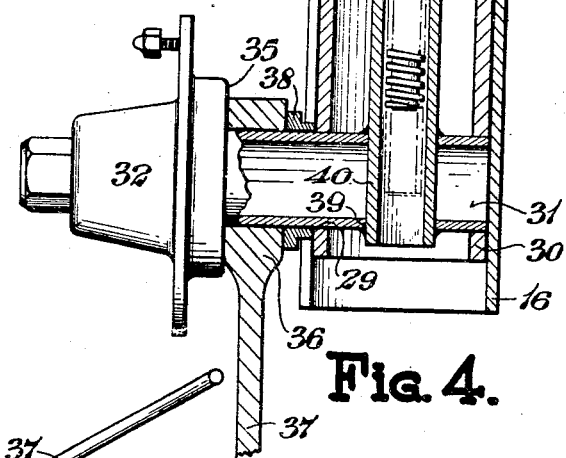
Fig. 4 is a central vertical section of the carrier-jack support, spindle and wheel hub, showing the hub in side elevation.

When it is desired to disconnect the towing or transporting motor vehicle from the coach 1 the crank 54 is revolved for the purpose of lowering the wheel 33 in contact with the ground at which point the weight of the forward part of the trailer 1 is removed from the tow bar coupler 6 and received by the tire 34 in contact with the ground thus making the act of uncoupling one of comparative ease. As shown in Fig. 1, if the rear wheels 2 of the coach are on a hill which is inclined upwardly toward the front 4 of the uncoupled coach the wheel 33 is not required to be lowered to its lowermost point in order that the floor of the coach 1 shall be level or positioned horizontally. On the other hand, as shown in Fig. 2, if the coach is on a hill which is inclined downwardly from the rear toward the front of the coach it may be necessary to lower the wheel 33 to its lowermost position for the purpose of leveling or horizontally positioning the floor of the trailer.

After the transporting motor vehicle is disconnected from the tow bar coupler 6, of the coach 1, the crank 54 is sufficiently revolved in the proper direction to lower the piston 22 in its lowermost position the spindle 31 slides from the slot 21, to the position represented by full lines in Fig. 6, whereby the lower end of the piston 22 protrudes from the lower end 16 of the tube 12 and the operator may grasp the hand contact handle 37 and revolve or rotate the wheel 33 and the spindle 31 around the lower end of the tube 12 horizontally of the axis of the spindle 31, for the purpose of guiding the front end of the trailer which may be manually pulled in any desired direction, or from one position to another.

An advantage of the invention is that the extra or front wheel 33 is concealed from view when it is in a retracted position, and at any time a tire on either of the rear wheels 2 is punctured, blows out or otherwise is damaged, the front wheel 33 may be lowered from its retracted or raised position and removed from the hub 32 and substituted for the rear wheel. Therefore, the support 11, which is utilized for other described purposes, also is an extra wheel carrier for instantaneous use by the operator when it is desired to substitute an interchangeable wheel for one of the two rear wheels.

Another advantage of the invention is that when the front wheel 33 is being carried or supported by the support 11, during the time the trailer is being towed over the highways, the lower edge of the tire 34 of the wheel 33 is elevated above the lower edge of the body of the trailer, whereby the extra or front wheel 33 is not visible to pedestrians or other persons. Moreover, since the wheel spindle 31 is received in the slot 21, contact of the spindle with the walls of the slot prevents pivotal movement of the front wheel around the horizontal axis of the spindle or around the tube.

Still another advantage of the invention is that when it is desired to disconnect the trailer from the transporting motor vehicle the extra or front wheel 33 may be quickly and conveniently lowered in contact with the ground for the purpose of supporting the front end of the trailer, thus making it possible for one person to perform the operation of uncoupling the trailer from the tow car with relative ease and complete safety, after which the hand contact handle, connected with the spindle 31, may be utilized for pulling the trailer to any desired location. The use of the invention for the purposes of uncoupling and positioning the trailer affords a ready means for permitting one person to do with ease and safety what was formerly a difficult and dangerous job to several persons.

Still another advantage of the invention is that after the trailer is positioned in a desired location the raising or lowering of the wheel 33, by mechanism previously herein fully described, enables the owner to level the floor of the coach so that it may efficiently and conveniently be utilized as cooking, sleeping, living or business quarters having a horizontal floor, irrespective of irregularity of the ground on which the trailer is positioned.

Still another advantage of the invention is that when the wheel 33 is lowered with the spindle 31 below the lower end 16 of the tube 12 the wheel is adapted to rotate or revolve around the tube 12 which is centrally disposed in the round front 4, of the trailer, whereby when it is desired to manually pull the trailer over the ground, by use of the hand contact handle 37, the wheel 33 and its spindle 31 is adapted to pivot or roll around the tube 12 which results in minimum effort being required to pull the trailer when the front end is being guided or steered in a sidewise direction.

It is, therefore, quite apparent that I have invented a simple, efficient and durable device for the purposes intended which may be effectively and conveniently utilized for the combination purposes of carrying a coach or trailer extra wheel, supporting the front end of the trailer, leveling the floor of the trailer, and manually steering and pulling the trailer over the ground from one location to another in any desired direction.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims. Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. The combination with a trailer having two rear wheels, a vertical tube being fixed adjacent the front of said trailer and having a slot whose side walls extend from the lower end toward the upper end of said tube, and having a bearing adjacent its upper end, a hollow piston slidably mounted in said tube, a front wheel spindle fixed to the lower end of said piston and being slidably received in said slot, a wheel rotatably mounted on said spindle, a nut fixed to the upper end of said piston, a screw threaded to said nut, a gear fixed to the top of said screw, a shaft received in said bearing, a gear fixed to the inner end of said shaft and meshing with said first mentioned gear, a hand contact crank fitted to the outer end of said shaft whereby rotation of said shaft is adapted to lower and raise said wheel, and a hand contact handle fixed to said spindle whereby said trailer is adapted to be manually steered and pulled from one location to another.

2. The combination with a trailer having two rear wheels, a vertical tube being fixed adjacent the front of said trailer and having a slot whose side walls extend from the lower end toward the upper end of said tube, a piston slidably mounted in said tube, a front wheel spindle fixed to said piston and being slidably received in said slot, a wheel rotatably mounted on said spindle, a nut fixed to the upper end of said piston, a screw threaded to said nut, a gear fixed to the top of said screw, a shaft received in said bearing, a gear fixed to the inner end of said shaft and meshing with said first mentioned gear, a hand contact crank fitted to the outer end of said shaft whereby rotation of said shaft is adapted to lower and raise said wheel, and a hand contact handle fixed to said spindle, whereby said trailer is adapted to be manually steered and pulled from one location to another.

3. The combination with a trailer having two rear wheels, of upper and lower spaced apart horizontal panels fixed to the front of said trailer, a vertical tube having a flange at its upper end and having a flange intermediate its upper and lower ends and having a slot whose side walls extend from the lower end toward the upper end of said tube, and having a bearing adjacent its upper end, a plate fixed to said top flange and having a hole centrally disposed therein, said plate and said intermediate flange being fixed to said upper and lower panels, respectively, a hollow piston slidably mounted in said tube, a wheel spindle fixed to the lower end of said piston and adapted to be slidably received in said slot, a wheel rotatably mounted on said spindle, a nut fixed to the upper end of said piston, a screw threaded to said nut and having its upper end protruding through said hole, a nut threaded to said upper protruding end and being screwed in close contact with the top of said plate, a bevel gear fixed to the top of said screw adjacent the bottom of said plate, a shaft received in said bearing, a bevel gear fixed to the inner end of said shaft and meshing with said first mentioned bevel gear, a hand contact crank fitted to the outer end of said shaft adapted to be manually rotated to lower and raise said wheel, and a hand contact handle fixed to said spindle whereby said trailer is adapted to be manually steered and pulled from one location to another.

4. The combination with a trailer having two rear wheels, of upper and lower spaced apart horizontal panels fixed to the front of said trailer, a vertical tube having a flange at its upper end and having a flange intermediate its upper and lower ends and having a slot whose side walls extend from the lower end toward the upper end of said tube, and having a bearing adjacent its upper end, a plate fixed to said top flange, said plate and said intermediate flange being fixed to said upper and lower panels, respectively, a hollow piston slidably mounted in said tube, a wheel spindle fixed to the lower end of said piston and adapted to be slidably received in said slot, a wheel rotatably mounted on said spindle, a nut fixed to the upper end of said piston, a screw threaded to said nut, a gear fixed to the top of said screw adjacent the bottom of said plate, a shaft received in said bearing, a gear fixed to the inner end of said shaft and meshing with said first mentioned gear, and a hand contact crank fitted to the outer end of said shaft adapted to be manually rotated to lower and raise said wheel.

5. The combination with a trailer having a round front and having two rear wheels, of upper and lower spaced apart horizontal panels fixed to said front of said trailer, a vertical support centrally disposed of said round front and comprising a vertical tube having a flange at its upper end and having a flange intermediate its upper and lower ends and having a slot whose side walls extend from the lower end toward the upper end of said tube, and having a bearing adjacent its upper end, a plate fixed to said top flange and having a hole centrally disposed therein, said plate and said intermediate flange being fixed to said upper and lower panels, respectively, a hollow piston slidably mounted in said tube, a wheel spindle fixed to the lower end of said piston and being slidably received in said slot, a front wheel rotatably mounted on said spindle, a nut fixed to the upper end of said piston, a screw threaded to said nut and having its upper end protruding through said hole, a nut threaded to said upper protruding end and being screwed in contact with the top of said plate, a bevel gear fixed to the top of said screw adjacent the bottom of said plate, a shaft received in said bearing, a bevel gear fixed to the inner end of said shaft and meshing with said first mentioned bevel gear, a hand contact crank fitted to the outer end of said shaft whereby rotation of said shaft is adapted to lower and raise said front wheel, said front wheel and said spindle adapted to be pivoted horizontally around the lower end of said tube when said front wheel is lowered to a predetermined point, and a hand contact handle fixed to said spindle whereby said trailer is adapted to be manually pulled from one location to another.

6. The combination with a trailer having a front and having rear wheels, of upper and lower spaced apart horizontal panels fixed to said front of said trailer, a vertical support comprising a vertical tube having a flange at its upper end and having a flange intermediate its upper and lower ends and having a slot whose side walls extend from the lower end toward the upper end of said tube, and having a bearing adjacent its upper end, a plate fixed to said top flange and having a hole centrally disposed therein, said plate and said intermediate flange being fixed to said upper and lower panels, respectively, a hollow piston slidably mounted in said tube, a wheel spindle fixed to the lower end of said piston and being slidably received in said slot, a front wheel rotatably mounted on said spindle, a nut fixed to the upper end of said piston, a screw threaded to said nut and having its upper end protruding through said hole, a nut threaded to said upper protruding end, a gear fixed to the top of said screw, a shaft received in said bearing, a gear fixed to the inner end of said shaft and meshing with said first mentioned gear, a hand contact crank fitted to the outer end of said shaft whereby rotation of said shaft is adapted to lower and raise said front wheel, said front wheel and said spindle adapted to be pivoted horizontally around the lower end of said tube when said front wheel is lowered to a predetermined point, and a hand contact handle fixed to said spindle whereby said trailer is adapted to be manually steered and pulled from one location to another.

RAY F. KUNS.